(12) United States Patent
Blankenship et al.

(10) Patent No.: US 9,027,262 B2
(45) Date of Patent: May 12, 2015

(54) SHOE WITH INTEGRAL PUMP

(75) Inventors: Ben Blankenship, Troy, MI (US); Sam Howard, Oxford, MI (US)

(73) Assignee: Efferent Technologies, LLC, Oxford, MI (US)

( * ) Notice: Subject to any disclaimer, the term of this patent is extended or adjusted under 35 U.S.C. 154(b) by 282 days.

(21) Appl. No.: 13/484,686

(22) Filed: May 31, 2012

(65) Prior Publication Data

US 2013/0133231 A1    May 30, 2013

Related U.S. Application Data

(60) Provisional application No. 61/565,023, filed on Nov. 30, 2011.

(51) Int. Cl.
| | |
|---|---|
| *A43B 23/00* | (2006.01) |
| *A43B 13/20* | (2006.01) |
| *A63B 41/12* | (2006.01) |
| *F04B 33/00* | (2006.01) |
| *F16K 15/20* | (2006.01) |

(52) U.S. Cl.
CPC .................. *A63B 41/12* (2013.01); *F04B 33/00* (2013.01); *A43B 13/203* (2013.01); *A43B 13/206* (2013.01); *F16K 15/20* (2013.01)

(58) Field of Classification Search
CPC .... A43B 13/203; A43B 13/206; A63B 41/12; F04B 33/00; F16K 15/20
USPC ........ 36/35 B, 3 R, 3 A, 3 B, 29, 147, 88, 89, 36/93, 153, 154
See application file for complete search history.

(56) References Cited

U.S. PATENT DOCUMENTS

| | | | | | |
|---|---|---|---|---|---|
| 3,738,024 | A | * | 6/1973 | Matsuda | 36/136 |
| 4,446,634 | A | * | 5/1984 | Johnson et al. | 36/29 |
| 5,253,435 | A | * | 10/1993 | Auger et al. | 36/88 |
| 5,295,313 | A | * | 3/1994 | Lee | 36/3 R |
| 5,477,626 | A | * | 12/1995 | Kwon | 36/3 B |
| 5,515,622 | A | * | 5/1996 | Lee | 36/3 R |
| 5,556,258 | A | * | 9/1996 | Lange et al. | 417/63 |
| 5,673,500 | A | * | 10/1997 | Huang | 36/136 |
| 6,085,444 | A | * | 7/2000 | Cho | 36/3 B |
| 6,409,618 | B1 | | 6/2002 | Touhey et al. | |
| 6,681,504 | B2 | * | 1/2004 | Kinan | 36/112 |
| 6,725,573 | B2 | * | 4/2004 | Doyle | 36/29 |
| 7,171,765 | B2 | * | 2/2007 | Lo | 36/29 |
| 7,681,329 | B2 | * | 3/2010 | Fu | 36/3 B |
| 2001/0045026 | A1 | * | 11/2001 | Huang | 36/29 |
| 2004/0088882 | A1 | * | 5/2004 | Buttigieg | 36/3 B |
| 2008/0163517 | A1 | * | 7/2008 | Chen | 36/3 B |
| 2008/0229623 | A1 | * | 9/2008 | Ferretti | 36/3 B |
| 2010/0132228 | A1 | * | 6/2010 | Polegato Moretti | 36/3 B |

* cited by examiner

*Primary Examiner* — Jila M Mohandesi
*Assistant Examiner* — Katharine Gracz
(74) *Attorney, Agent, or Firm* — Gifford, Krass, Sprinkle, Anderson & Citkowski, P.C.

(57) ABSTRACT

A shoe, such as an athletic shoe, includes a pump assembly integral therewith. The pump assembly includes a pump which produces a stream of pressurized air and a delivery assembly which operates to deliver the stream of pressurized air to an end use location exterior of the shoe. The shoe may comprise an athletic shoe and may be utilized to inflate sports balls such as basketballs, footballs, and volleyballs.

6 Claims, 5 Drawing Sheets

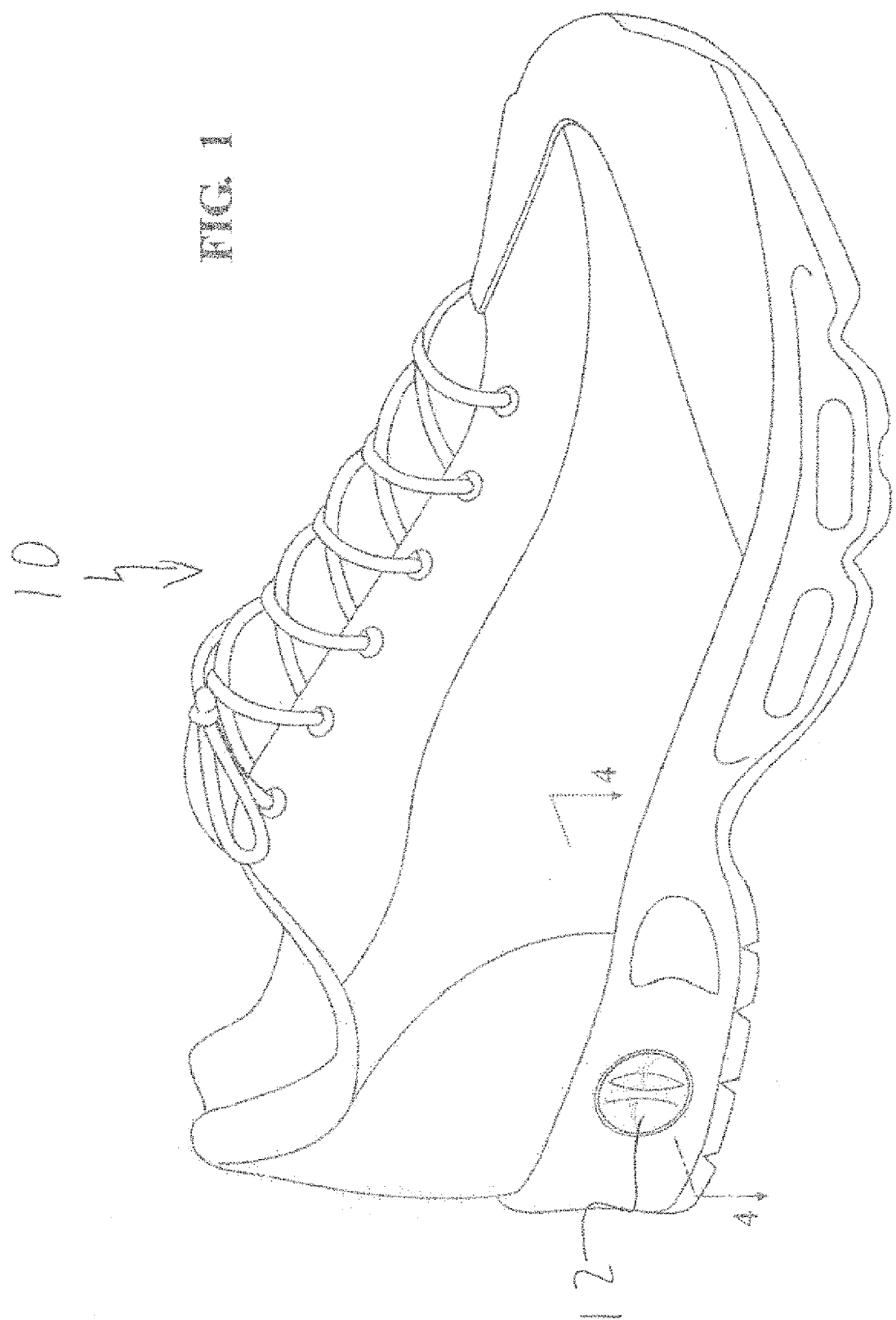

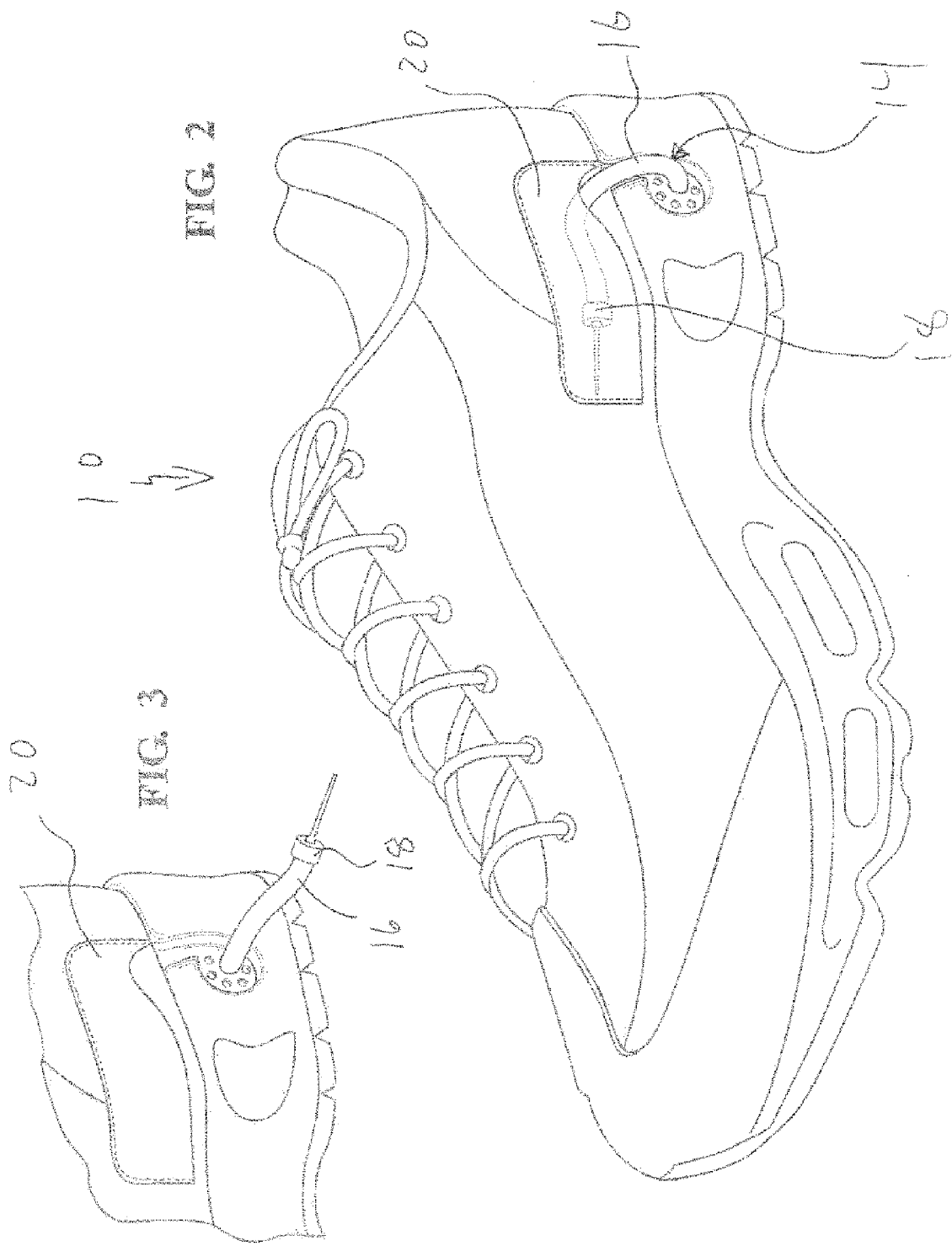

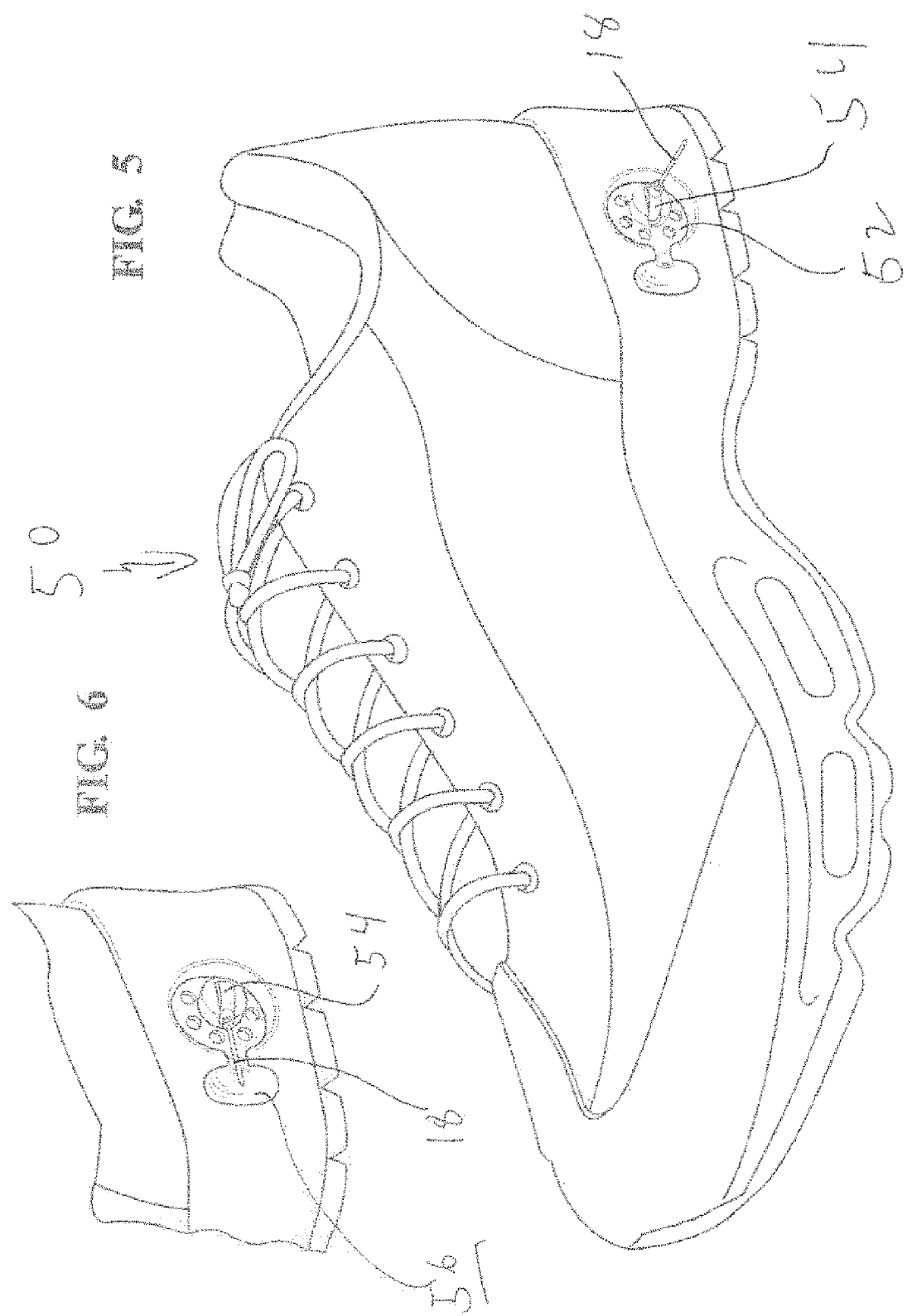

SHOE WITH INTEGRAL PUMP

CROSS-REFERENCE TO RELATED APPLICATIONS

This application claims priority of U.S. Provisional Patent Application 61/565,023 filed Nov. 30, 2011, the contents of which are incorporated herein by reference.

FIELD OF THE INVENTION

This invention relates generally to athletic equipment, and more particularly to athletic shoes. Specifically, the invention relates to an athletic shoe having an inflation pump integral therewith which pump may be used for inflating basketballs, footballs, and the like.

BACKGROUND OF THE INVENTION

Many athletic games such as basketball, football, soccer, volleyball, and the like rely upon the use of an inflated, resilient ball. Improper inflation of the ball adversely affects the play and quality of the game. Typically, game balls are inflated through the use of a separate pump employed in combination with an inflation needle. However, it very often occurs that in the course of play, a player will find that a game ball is not properly inflated; and very often, such a traditional pump/needle assembly is not available, particularly if play is taking place in an informal location.

The prior art has recognized this problem and has developed game balls which include an integral, manually operated pump. Such ball/pump assemblies are shown in U.S. Pat. No. 6,409,618, the disclosure of which is incorporated herein by reference. While such combination ball/pump assemblies do address the problem of improperly inflated game balls, they rely upon the use of integral pump assemblies which are expensive and do not address the problem of improper inflation with regard to presently existing balls. In addition, it has been found that in some instances inclusion of the integral pump affects the balance and play of the ball.

As will be explained hereinbelow, the present invention comprises an athletic shoe which includes an integral air pump configured and operable to use for the inflation of game balls or other items at a location exterior of said shoe. The pump of the present invention does not affect the comfort or action of the shoe. These and other advantages of the invention will be apparent from the drawings, discussion, and description which follow.

SUMMARY OF THE INVENTION

Disclosed is a shoe having a pump assembly integrally incorporated therein. The pump assembly includes a pump portion which is operable to produce a stream of pressurized air and a delivery assembly which is operable to deliver said stream of pressurized air to an end use location exterior of the shoe. In specific embodiments, the pump assembly is manually activatable. The delivery assembly may also include an inflation needle for pressurizing an inflatable body such as a sports ball. The delivery assembly may further include a pressure hose for conveying said pressurized air to an end use location, and an inflation needle may be affixed either permanently or removably to the pressure hose. In some embodiments, the shoe may include a pocket or other storage compartment integral therewith which is configured to retain portions of the delivery assembly such as a pressure hose and/or inflation needle therein.

In some embodiments, the pump may include an activation handle and this handle may be lockable into a storage position. In particular embodiments, the delivery assembly may include a rotary valve, and an inflation needle may optionally be connected to the rotary valve. In yet other embodiments, the shoe may further include a pressure gauge for indicating pressurization of an item. The pressure gauge may be integral with the pump or it may be integral with a portion of the shoe. Further disclosed are methods for using the shoe/pump device.

BRIEF DESCRIPTION OF THE DRAWINGS

FIG. 1 is a right side perspective view of a shoo of the present invention;

FIG. 2 is a left side perspective view of the shoe of FIG. 1;

FIG. 3 is an illustration of a portion of the shoe of FIG. 2 showing an inflation needle extended therefrom;

FIG. 5 is a left side view of another embodiment of a shoe of the present invention;

FIG. 6 is an enlarged view of a portion of the shoe of FIG. 5;

DETAILED DESCRIPTION OF THE INVENTION

Figure 4:
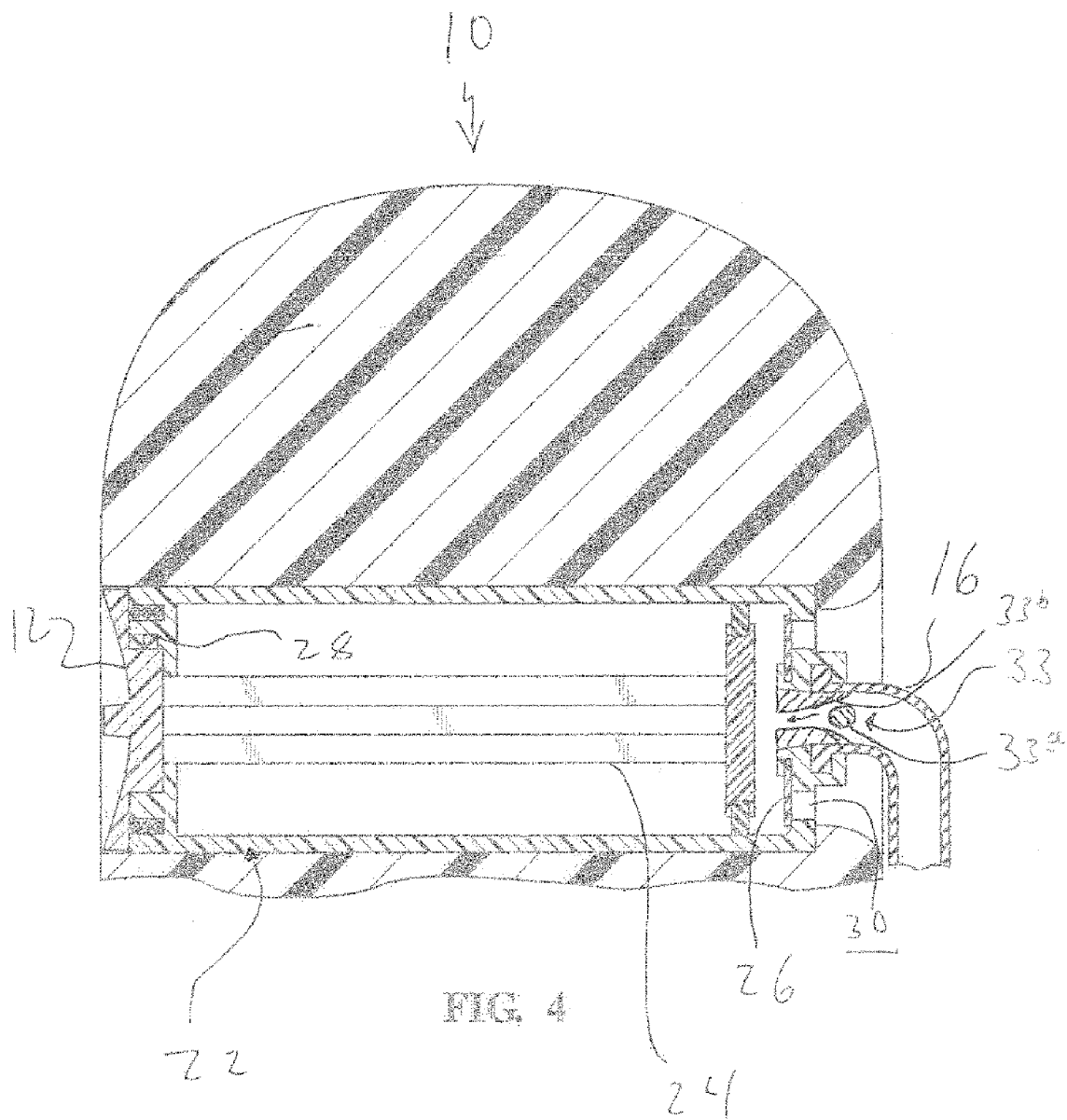
FIG. 4 is a cross-sectional view of a portion of the shoe of FIG. 1 taken through line 4-4.

Referring now to FIG. 1, there is shown a perspective view of an athletic shoe 10 of the present invention incorporating an integral inflation pump therein. While FIG. 1 shows a shoe of a particular design, it is to be understood that the present invention may be implemented utilizing footwear of any design including high-top designs as well as low-top designs. Also, the shoe may comprise a sandal as well as a dress shoe. The shoe of FIG. 1 includes an integral pump, and a portion of an actuator handle of the pump is shown in FIG. 1 at reference numeral 12.

Referring now to FIG. 2, there is shown a perspective view of the opposite side of the shoe 10 of FIG. 1. Illustrated in FIG. 2 is an inflation portion 14 of the pump assembly. In this regard, the inflation portion includes an inflation hose 16 having an inflation needle 18 either permanently or removably affixed thereto. As will be seen from the figure, when the pump is not being utilized the inflation needle 18 and a portion of the inflation hose 16 are stowed in a pocket 20 which is affixed to the shoe. It is to be understood that in other embodiments of the invention, the inflation hose and/or needle may be otherwise configured, and the pocket may be otherwise disposed or it may be eliminated.

Referring now to FIG. 3, there is shown a view of a portion of the shoe of FIG. 2 illustrating the inflation hose 16 and associated needle 18 as being deployed from the pocket 20 to a use position for the inflation of a ball.

Referring now to FIG. 4, there is shown a cross-sectional view of a portion of the shoe of the foregoing figures taken along through line 4-4 in FIG. 1, in a direction generally parallel to the sole of the shoe. Specifically shown in FIG. 4 is a cross-sectional view of the pump 22. As will be seen, this pump 22 includes the actuating handle 12 as seen in FIG. 1, an inflation piston 24, and the inflation hose 16. The pump also includes a valve assembly 26.

In a typical pump assembly, the actuating handle 12 is retained in a locked, storage position by an integral detent/slot assembly 28 which in particular embodiments is configured so that a slight rotation of the handle 12 will release the detent 28 allowing the handle 12 to be withdrawn from the pump assembly 22 thereby moving the piston assembly 24 to a first position spaced from the inflation hose 16 and valve assembly 26.

As will be appreciated from the drawing, the valve assembly 26 includes a resilient sealing member such as a body of elastomer disposed so as to cover an opening 30 in the pump housing. When pump handle is withdrawn, the valve assembly 26 opens allowing air to be drawn into the pump housing. Thereafter, the pump handle 12 is depressed thereby compressing the resilient member so as to seal the opening 30 thereby closing the valve assembly 26 and allowing air to be driven out of the inflation hose 16 and through the associated needle 18, and into a ball affixed to the needle. The pump will typically include a check valve assembly 33 which operates to prevent pressurized air from flowing back out of the ball and into the pump housing. As is known in the art, one such check valve comprises a ball 33a disposed in a tapered seating member 33b, wherein back pressure will seal the ball 33a against the seating member 33b. Other check valve configurations are known in the art and may be incorporated into this invention. The pumping cycle is repeated so as to further inflate the ball. After proper inflation is achieved, the pump handle is again locked and the inflation needle stowed.

The foregoing illustrates one specific embodiment of pump, and it is to be understood that this invention may be practiced with pumps of other designs. Some specific designs of pumps which may be utilized herein are shown in U.S. Pat. No. 6,409,618 referenced above; however, other embodiments of pump may also be employed.

Referring now to FIG. 5, there is shown yet another embodiment of the present invention as incorporated into an athletic shoe 50. In this embodiment the inflation assembly portion 52 of the pump differs from that of FIG. 2 insofar as it does not include a separate inflation hose 16. In this embodiment, the inflation needle 18 is rotatably affixed to the remainder of the pump by a rotary valve 54. In this regard, the drawing of FIG. 5 shows the rotary valve 54 in a first inflation position wherein the needle 18 projects from the sole of the shoe 50. FIG. 6 shows the valve 54 in a storage position wherein the needle 18 is disposed in a recess 56 formed in the sole of the shoe 50.

Figure 7:
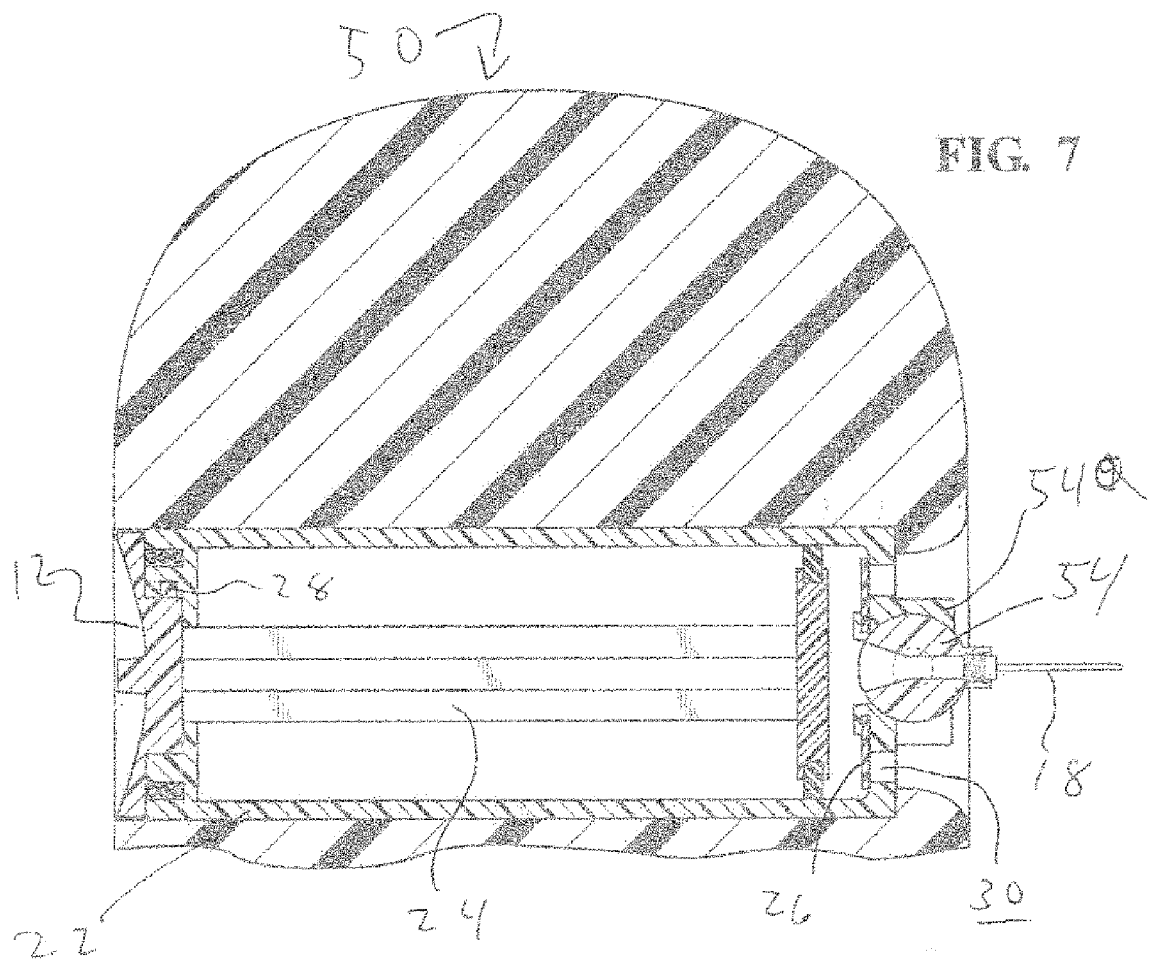
FIG. 7 is a cross-sectional view of the shoe of FIG. 5 showing the inflation needle in a first position.

Referring now to FIG. 7, there is shown a cross-sectional view of a portion of the shoe 50 of FIG. 5 as taken generally parallel to the sole. In this drawing the major portion of the pump assembly 22 is generally similar to that shown in FIG. 4, and like structures are referred to by like reference numerals. Where the embodiment of FIG. 7 differs from that of FIG. 1 is that it includes the rotary valve 54 having the needle 18 projecting therefrom. As will be seen from FIG. 7, the rotary valve 54 is rotatably supported in a valve body 54a and includes an air passage which, when the valve is in its first position as shown in FIG. 7, is in communication with the interior portion of the pump assembly. Although not illustrated, the embodiment of FIGS. 5-8 may also include a check valve assembly as shown and described with regard to FIG. 4.

Figure 8:
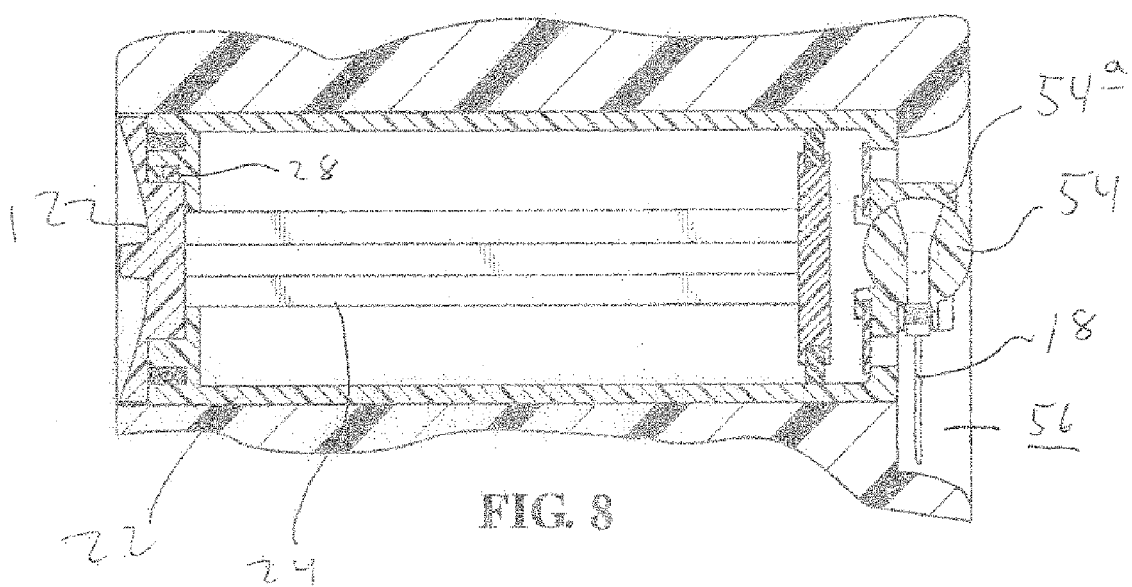
FIG. 8 is a cross-sectional view of the shoe of FIG. 5 showing the inflation needle in a stored position.

As will be seen in FIG. 8, when the valve 54 is in a second, storage position, the air passage is no longer in communication with the interior of the pump.

Other embodiments, modifications and variations of the invention may be implemented. For example, while a manually activatable pump is shown in the figures, the invention may also be practiced utilizing a battery-powered pump. A pressure gauge may be included in other embodiments. This pressure gauge may be integral with the shoe itself, and may be molded into the sole. Alternatively, the gauge may be integral with the pump. For, example, the pressure gauge may be disposed on the pump handle. In yet other embodiments, the pump may be further modified so as to permit depressurization of the inflated ball. This may be accomplished by including a control which deactivates the check valve 33 of FIG. 4. In other instances, depressurization may be achieved through the use of a separate depressurization valve (not shown) which is in fluid communication with the inflation needle.

The foregoing represents some specific embodiments of the present invention, and it is to be understood that the invention may be implemented in yet other configurations. Such modifications and variations thereof will be readily apparent to those of skill in the art in view of the drawings, discussion, and description, presented herein. The foregoing is illustrative of specific embodiments of the invention but is not meant to be a limitation upon the practice thereof. It is the following claims, including all equivalents, which define the scope of the invention.

The invention claimed is:

1. A shoe having a pump assembly incorporated therein, said pump assembly including:
   a pump portion which is activatable to produce a stream of pressurized air; and
   a delivery assembly which is operable to deliver said stream of pressurized air to an end use location exterior of said shoe, said delivery system including an inflation needle configured and operative to pressurize a sports ball; and a rotary valve having said inflation needle affixed thereto, said rotary valve being disposed in a recess in a sole of said shoe, and being rotatable from an inflation position wherein said needle projects from said sole to a storage position in which said needle is disposed in said recess defined in said sole.

2. The shoe of claim 1, wherein said pump assembly is manually activatable so as to deliver said stream of pressurized air.

3. The shoe of claim 1, wherein said pump portion includes an activating handle.

4. The shoe of claim 3, wherein said activating handle is selectably lockable so that when it is in a locked position it cannot be withdrawn from the shoe, and when it is in an unlocked position it can be withdrawn from the shoe.

5. The shoe of claim 1, wherein said shoe is an athletic shoe.

6. A method for inflating an article, said method comprising the use of the pump assembly of claim 1.

* * * * *